United States Patent [19]

Krimmer et al.

[11] Patent Number: 5,666,922
[45] Date of Patent: Sep. 16, 1997

[54] FUEL LINE CONNECTOR

[75] Inventors: Erwin Krimmer, Pleuderhausen; Peter Jauernig, Tiefenbronn; Bruno Hezel, Stuttgart; Andreas-Bernd Rosenbusch, Korb, all of Germany

[73] Assignee: Robert Bosch GmbH, Stuttgart, Germany

[21] Appl. No.: 454,485

[22] Filed: May 30, 1995

[30] Foreign Application Priority Data

Jun. 10, 1994 [DE] Germany .................. 94094276 U
Feb. 18, 1995 [DE] Germany .................. 195 055 74.8

[51] Int. Cl.⁶ .................................................. F02M 55/02
[52] U.S. Cl. .......................... 123/470; 123/469; 285/320
[58] Field of Search ............................ 123/470, 472, 123/468, 456; 285/308, 319, 320, 921

[56] References Cited

U.S. PATENT DOCUMENTS

| | | | |
|---|---|---|---|
| 3,686,896 | 8/1972 | Rutter | 285/320 |
| 4,913,119 | 4/1990 | Usui | 123/470 |
| 4,956,151 | 9/1990 | Steck | 285/320 |
| 5,022,355 | 6/1991 | Billingsley | 123/468 |
| 5,083,433 | 1/1992 | Leigh-Monstevens | 285/921 |
| 5,213,376 | 5/1993 | Szabo | 285/921 |
| 5,219,188 | 6/1993 | Abe | 385/319 |
| 5,323,808 | 6/1994 | Shimizu | 285/320 |
| 5,452,924 | 9/1995 | Kujawski | 285/308 |
| 5,511,527 | 4/1996 | Lorraine | 123/469 |
| 5,511,827 | 4/1996 | Steinkamp | 285/319 |

Primary Examiner—Carl S. Miller
Attorney, Agent, or Firm—Edwin E. Greigg; Ronald E. Greigg

[57] ABSTRACT

A fuel line connector for producing recirculation of leakage fuel in a fuel injection valve in which communication of a fuel line with a connection bore of a housing, and with the holder of a fuel injection valve is produced. This is achieved by providing that the fuel line connector has elastically deformable retaining arms, which, after a connecting stub of the fuel line connector has been plugged into a connection bore, engage the housing that contains the connection bore from behind.

17 Claims, 2 Drawing Sheets

FUEL LINE CONNECTOR

BACKGROUND OF THE INVENTION

The invention is based upon a fuel line connector as defined hereinafter. German patent disclosure document 20 61 207 makes known a fuel line connector of this kind in which the connecting stub, which is plugged into the connection bore, is acted upon in the connection bore by a pressure spring which brings the connecting stub toward the outside into contact with a snap ring, which has a collar, and holds it there in a secured position. Upon insertion of the fuel line connector according to this known embodiment, the connecting stub is first introduced partway into the connection bore till the collar comes into contact with the snap ring. In the course of the further insertion motion, the snap ring deflects farther into an annular groove, thus allowing the collar to be inserted past the snap ring and allowing the connecting stub to be inserted all the way into the connection bore.

This kind of connector has the disadvantage that a pressure spring is provided inside the connection bore for securing the position, which spring can get lost in a disassembly and which for assembly must be separately introduced and there is the further disadvantage that an especially embodied annular groove and a spring ring are necessary to hold the fuel line connector in its secured plug-in position. The individual pieces must be precisely manufactured and the spring elements must be exactly adapted to their functions.

OBJECT AND SUMMARY OF THE INVENTION

The fuel line connector according to the invention has the captive, at least one elastically deformable retaining arm, which comes into contact with rest shoulders, which are simple to manufacture. Particularly if the connector is manufactured of plastic, such a retaining arm can be produced in a simple and inexpensive manner. Furthermore, the fuel line connector can be assembled very quickly and simply. Especially advantageously, the at least one retaining arm, or one of two retaining arms, is of metal. Given good resilient properties, a very small amount of space is thus required for the fuel line connector. By means of the improvement according to the invention, there is the further possibility of also simply releasing the fuel line connector into the connection bore again from its stopped position in the plugged-in state of the connecting stub. With a further feature defined herein, a substantial simplification of the assembly and installation of the fuel line connector is attained, especially when installed where there is little space available in the region of fuel injection valve receiving shafts in internal combustion engines. A fuel leakage line, which extends parallel to the individual fuel injection valve, can furthermore in a space saving manner adjoin the fuel line connector, which advantageously constitutes a part of a line extending in a T-shape or in an angle shape. Through the use of synthetic material such as plastic, a durably elastic, articulated connection between the crosspiece and the retaining or actuating arms is obtained.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
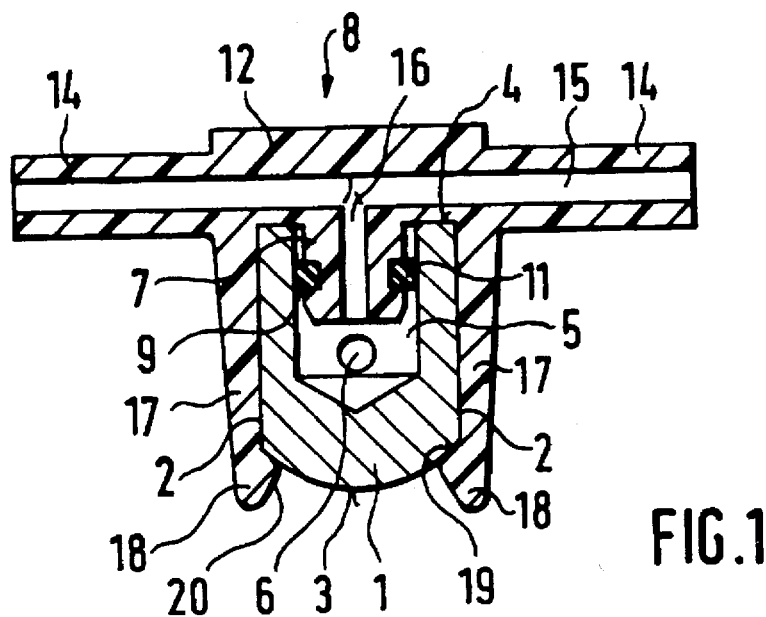
FIG. 1 shows a first exemplary embodiment having a fuel line connector, which constitutes a part of a line extending in a T-shape and which is simply snapped onto the retainer of a fuel injection valve comprised of retainer and nozzle.

FIG. 1 describes a sectioned part of a fuel injection valve. It is about the so called "nozzle holder" of a conventional fuel injection valve comprised of nozzle holder and "nozzle". The nozzle holder 1 has flattened sides 2 parallel to each other, in which the end transitions into an arc-shaped jacket part 3. Opposite from the arc-shaped jacket part 3, the sides 2 transition are connected by a flat face end 4, into which extends a connection bore 5. This connection bore intersects a leakage conduit 6 arranged perpendicularly in the nozzle holder and serves to receive a connecting stub 7 of the fuel line connector 8 according to the invention. The connecting stub 7 has an annular groove 9, into which a toroidal sealing ring 11 or also a different shaped sealing ring is inserted, which with prestressing comes sealingly into contact with its outer circumference against the cylinder wall of the connection bore and consequently closes off the connection bore from the outside. The line connector is comprised of synthetic material such as plastic and has a base part 12, branching off from which are connecting branch parts 14, which communicate with each other by means of a common, linear through bore 15. The connecting parts allow the attachment of a hose line on each end, which continues from there and is not shown further here.

A branch bore 16, which is coaxial to the connecting stub 7, branches off from the through bore 15 in the region of and vertical to the base part, which branch bore 16, in the inserted or plugged-in state, feeds into the connection bore 5 and therefore produces the communication with the bore 6 extending axially in the nozzle holder.

Furthermore, two integral retaining arms 17 branch off from the base part 12; they embrace the flattened sides 2 of the nozzle holder, and with thickened curved ends 18 on which a detent face 19 is formed, they come into contact with the jacket part 3, extending in arc-shaped fashion, of the nozzle holder. This jacket part furnishes the corresponding detent face for the retaining arms 17; after the retaining arms 17 have snapped elastically into place behind the jacket part 3, this detent face holds the fuel line connector securely in its plugged-in position. The thickened ends of the retaining arms, moreover, also have insertion bevels 20, which make it easier for the resilient arms 17 to slip past the flat face ends 4. Hence a fuel line connector is produced, which is simple to manufacture in injection technology, can be assembled very quickly and simply, and which is held securely in the plugged-in connected position.

Figure 2:
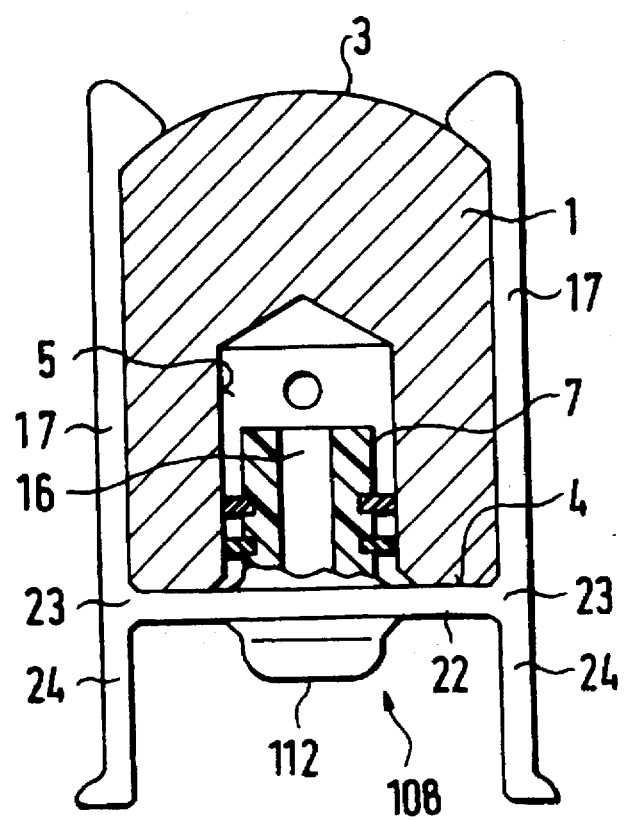
FIG. 2 shows a second exemplary embodiment having a fuel line connector, which can be released in a simple manner.

In the second exemplary embodiment according to FIG. 2, which is represented schematically, an equally embodied nozzle holder 1 is provided, in whose connection bore 5, on the other hand, the connecting stub 7 is sealingly inserted. In this case, an angle connection is realized, by having the bore 16, which extends coaxial to the connecting stub, merge at a right angle in its outer region with a bore, not shown here, which continues inside a connecting part. With the connecting part, on the other hand, communication can be established with a hose line that continues from there. Unlike FIG. 1, in this embodiment a crosspiece 22 that is perpendicular to the connecting stub branches off from both sides of the base part 112 that carries the connecting stub 7; the crosspiece extends parallel to the flat face end 4 of the retainer and constitutes elastic joints 23 on its ends, which joints are disposed between the crosspiece and the retaining arms 17, which attach to the joints and extend perpendicular to the crosspieces. In a rearward extension of the retaining arms 17, beginning at the joints 23, actuating arms 24 are furthermore provided, which are embodied as rigid and of one piece with the retaining arms 17. If these actuating arms 24 are moved toward each other, the retaining arms 17 disengage from their contact with the circularly extending jacket part 3 of the retainer 1, and as a result, the line connector 108 can easily be released from its plugged-in position. This achieves disassembly in a simple manner, which makes repair, such as dismantling of the fuel injection valve, considerably easier, with the advantages already mentioned from the embodiment according to FIG. 2. Naturally the embodiment according to FIG. 2 can also be embodied as a fuel line connector extending in a T, and other forms of the further course of the line beginning at the connecting stub 7 are also possible.

Figure 3:
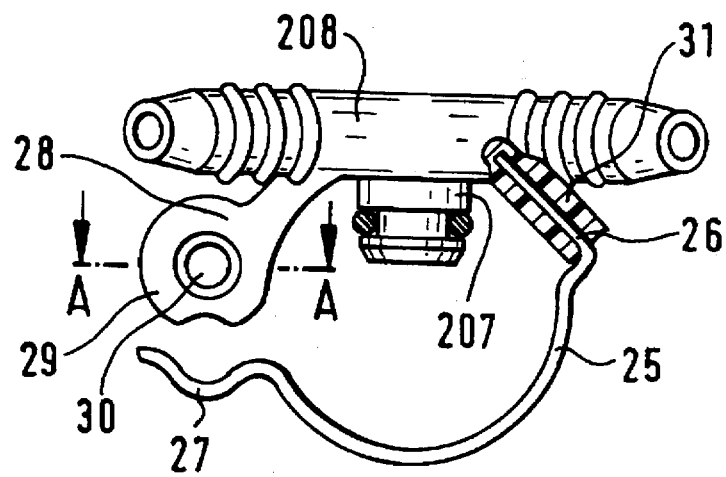
FIG. 3 is a plan view on a third exemplary embodiment, with a retaining arm made of a metal part that largely encompasses the fuel injection valve.
Figure 4:
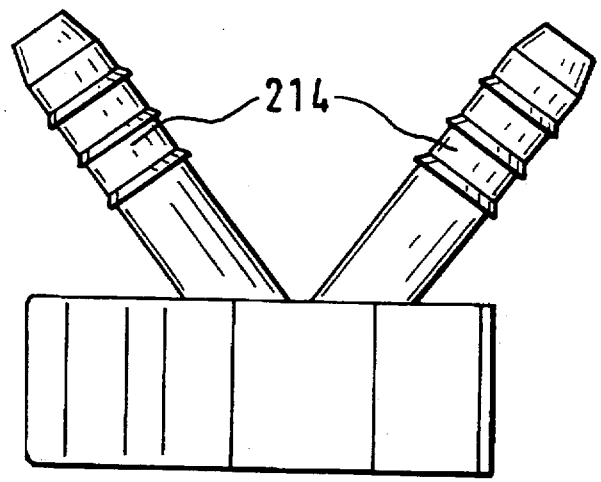
FIG. 4 is a side view of FIG. 3.

In a third exemplary embodiment shown in FIG. 3, a fuel line connector 208 is again provided, which is intended in particular for attachment to fuel injection valves that are built into cylinder heads of internal combustion engines where there is little installation space available. In such cases, only narrow receiving shafts can often be provided for such injection valves, which makes the final installation of oil leakage lines at injection valves more difficult. In the present case, two connection pieces 214 are provided on the fuel line connector, for the attachment of hoses that lead onward. Taking the tight space situation into account, these two connecting pieces are inclined in a V to one another, as can be seen from FIG. 4. Connecting lines can thus be lead upward away from the engine block.

Figure 5:
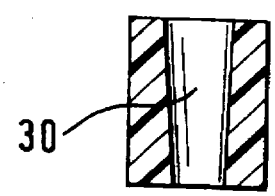
FIG. 5 is a section taken along the line A—A of FIG. 3.

The fuel line connector 208 is in turn made of plastic. However, one retaining arm 25 is a resiliently deflectable metal part, which is firmly embedded by one end 26 in the plastic of the fuel line connector 208. This retaining arm 25 is embodied as partly circular or arc shaped in the region located outside the plastic, with an actuating part 27 on its free end. This partial circular shape is intended, with a circular-cylindrical retainer of the associated fuel injection valve, to adapt to the jacket face of the retainer. A second retaining arm 28 also projects from the fuel line connector 208; it is made of plastic and is integrally formed onto the fuel line connector 208. This second retaining arm has on its end a circular-cylindrical part 29, which has a recess 30 in the middle that, as can be seen from the sectional view of FIG. 5, is a conical circular-cylindrical bore with an axis that extends parallel to the axis of the associated fuel injection valve. Facing this recess 30 is the actuating part 27, which in the relaxed state of the retaining arm 25 assumes a position at a distance from the circular-cylindrical part 29. This spacing distance is dimensioned such that it corresponds to the diameter of the recess 30, in such a way that in this relaxed state, conical prongs of a spreader tool can be introduced into the recess 30 and into the region between the actuating part 27 and the circular-cylindrical part 29. Advantageously, the faces opposite one another of the actuating part 27 and the circular-cylindrical part 29 are embodied as circular-cylindrical partial faces, analogously to the circular-cylindrical wall of the recess 30.

Protruding from the part of the fuel line connector 208 opposite the retaining arm 25 is in turn the stub 207, known from the preceding exemplary embodiments, which upon assembly is introduced into the corresponding connecting bore 5 of the nozzle holder 1. To this end, with the aid of the spreader tool, which is introduced into the recess 30 and into the space between the retainer arm 25 and the second retaining arm 28, the retaining arm 25 of the fuel line connector 208 is spread, in such a manner that the fuel line connector 208 can be slipped axially onto the nozzle holder 1 until the stub 207 can plunge into the corresponding connecting bore. Once the spreader tool is removed, the retaining arm 25 consequently presses flush against the outer surface of the nozzle holder and firmly holds the stub 207 inside the connecting bore 5. The second retaining arm 28 here serves as an additional supporting element and serves, together with the plastic part 31, which includes the end 26, of the fuel line connector 208, to center the fuel line connector 208. With this embodiment, the line connector 208 can be mounted axially from above in a simple way, even if the mounting shaft of the fuel injection valve is very narrow and there is little space. Consequently, the line connector is guided together with the spreader tool via the injection valve and then the spreader tool is removed once assembly is complete. In particular, this advantageously solves the problem of a tight installation space.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A plastic fuel line connector having a connecting stub (7), which can be plugged into a connection bore (5) of a housing (1) and which produces a sealed communication by means of a seal (11) that surrounds the connecting stub together with the connection bore (5), a device for axially fixing the connecting stub (7) in the connection bore, the device for axial fixation of the connecting stub comprises a resiliently deflectable metal retaining arm that originates laterally from the connecting stub and has one end that is embedded into the plastic fuel line connector, said arm extends in a plane longitudinally of an axis of the stub and extends resiliently along the housing (1) that receives the connection bore (5) when the connecting stub has reached its final plugged-in position.

2. A plastic fuel line connector having a connecting stub (7), a housing (1), said connection stub (7) can be plugged into a connection bore (5) of said housing (1) to produce a sealed communication by means of a seal (11) that surrounds the connecting stub and is in contact with the connection bore (5), a device for axially fixing the connecting stub (7) in the connection bore, the device for axial fixation of the connecting stub comprises two elastically deformable retaining arms (17) which are integrally formed onto said fuel line connector and originates laterally from the connecting stub, said two elastically deformable arms extend in a plane longitudinally of the axis of the stub or parallel to it and extends resiliently behind the housing (1) when the connecting stub has reached its final plugged-in position in the connection bore (5), two actuating arms (24) are disposed on the fuel line connector, said two actuating arms (24) protrude from the fuel line connector, in an opposite direction to the direction of a corresponding respective one of the retaining arms (17), and the retaining arms and actuating arms are connected to the fuel line connector in such a way that they constitute with it an elastic, articulated connection point so that the retaining arms can swing out from their rest position upon actuation of the actuating arms (24).

3. A fuel line connector comprising an elongated base including a connection stub (7) extending therefrom, a housing (1), said connection stub (7) is insertable into a connection bore (5) in said housing, said connection stub includes a seal (11) disposed on the connection stub, said seal together with the connection bore (5) establishes a tight connection, at least one elastically deformable holder arm (17) projects from said base laterally from the connection stub, at least one arm extends in a plane in a longitudinal direction of an axis of the connection stub or parallel thereto and has a free end that resiliently engages a shoulder on the housing from behind once the connection stub has attained a final inserted position, said housing is a sectioned part of a fuel injection valve that includes a nozzle holder and nozzle; the connection stub serves to return fuel for recirculation; and that the at least one holder arm is located in a radial plane to an axis of the nozzle holder and engages the housing of the nozzle holder of the injection valve from behind.

4. The fuel line connector according to claim 3, in which the device comprises two elastically deformable retaining arms (17) extending from said base in the longitudinal direction of the connecting stub, spaced apart from it, which retaining arms (17) have first detent shoulders (19), with which they can resiliently snap into place behind corresponding second detent shoulders (3) on the housing (1), which contains the connection bore (5), when the connecting stub has reached its final plugged-in position.

5. The fuel line connector according to claim 3, in which the fuel line connector is comprised of plastic.

6. The fuel line connector according to claim 4, in which the fuel line connector is comprised of plastic.

7. The fuel line connector according to claim 3, in which the fuel line connector is of plastic, and the at least one retaining arm is integrally formed onto the fuel line connector.

8. The fuel line connector according to claim 4, in which the fuel line connector is of plastic, and the at least one retaining arm is integrally formed onto the fuel line connector.

9. The fuel line connector according to claim 4, in which two actuating arms (24) are disposed on the fuel line connector, which protrude from the fuel line connector, in an opposite direction to the direction of a corresponding respective one of the retaining arms (17), and the retaining arms and actuating arms are connected to the fuel line connector in such a way that they constitute with it an elastic, articulated connection point so that the retaining arms can swing out from their rest position upon actuation of the actuating arms (24).

10. The fuel line connector according to claim 1, in which the retaining arm embodied as a resiliently deflectable metal part is embodied in the form of a split ring, which together with a second retaining arm at least partly encompasses the housing.

11. The fuel line connector according to claim 10, in which shaped faces are provided both on the retaining arm embodied as a metal part and on the second retaining arm, shaped faces are provided, which have contact faces for a spreader tool for spreading open the retaining arm embodied as a metal part, the contact faces being oriented toward one another and extending substantially at right angles to the axial plane of the connecting stub.

12. The fuel line connector according to claim 11, in which the shaped face on the second retaining arm is embodied as a conical recess.

13. The fuel line connector according to claim 3, in which the connection bore is disposed in a fuel injection valve (1) for recirculation of leaked fuel.

14. The fuel line connector according to claim 13, in which the at least one retaining arm (17) embraces the housing (1) of the fuel injection valve, which is comprised of a nozzle holder and a nozzle, in a plane situated radially to the axis of the housing.

15. The fuel line connector according to claim 13, in which on the fuel line connector, in addition, at least one connecting part is provided for the attachment of a fuel line which continues from the fuel line connector.

16. The fuel line connector according to claim 15, in which the connecting part (14), together with the connection stub (7) comprises a part of a line extending at an angle.

17. The fuel line connector according to claim 13, in which a crosspiece leads from both sides of the connection stub (7), outside of a region of the connection stub which can be covered by the connection bore, on crosspiece ends, and of one piece with the ends, the retaining arms and attachment arms are disposed together in an elastically pivotable manner.

* * * * *